United States Patent
Clapp

(10) Patent No.: US 7,496,262 B2
(45) Date of Patent: Feb. 24, 2009

(54) METHOD AND APPARATUS FOR TRANSFORMING OPTICAL WAVE MODES

(75) Inventor: Terry Victor Clapp, Hertfordshire (GB)

(73) Assignee: Dow Corning Corporation, Inc., Auburn, MI (US)

( * ) Notice: Subject to any disclaimer, the term of this patent is extended or adjusted under 35 U.S.C. 154(b) by 114 days.

(21) Appl. No.: 10/576,596

(22) PCT Filed: Oct. 19, 2004

(86) PCT No.: PCT/GB2004/004420

§ 371 (c)(1),
(2), (4) Date: Nov. 28, 2006

(87) PCT Pub. No.: WO2005/045490

PCT Pub. Date: May 19, 2005

(65) Prior Publication Data

US 2007/0211983 A1 Sep. 13, 2007

(30) Foreign Application Priority Data

Oct. 23, 2003 (GB) .................................. 0324776.4

(51) Int. Cl.
*G02B 6/10* (2006.01)
(52) U.S. Cl. ........................... 385/129; 385/131; 385/37
(58) Field of Classification Search .................. 385/129
See application file for complete search history.

(56) References Cited

U.S. PATENT DOCUMENTS

| | | | |
|---|---|---|---|
| 4,901,321 A | 2/1990 | Blondeau et al. ................ 372/7 |
| 5,078,516 A | 1/1992 | Kapon et al. ................ 385/129 |
| 5,163,118 A | 11/1992 | Lorenzo et al. ............. 385/132 |
| 5,563,979 A | 10/1996 | Bruce et al. .................. 385/142 |
| 5,703,989 A | 12/1997 | Khan et al. ................. 385/130 |
| 5,745,630 A | 4/1998 | Vawter et al. ................ 385/129 |
| 6,987,910 B2 * | 1/2006 | Shappir et al. ................ 385/37 |
| 2003/0039447 A1 | 2/2003 | Clapp .......................... 385/40 |

FOREIGN PATENT DOCUMENTS

| | | |
|---|---|---|
| GB | 2 306 694 | 5/1997 |
| GB | 2345980 A | 7/2000 |
| GB | 2355079 A | 4/2001 |
| GB | 2373342 A | 9/2002 |
| GB | 2374155 A | 10/2002 |
| WO | WO95/04521 | 10/1985 |
| WO | WO03/003420 | 1/2003 |

OTHER PUBLICATIONS

PCT/GB2004/004420 International Search Report (Jan. 27, 2005).
Letter re: Application No.: GB 0324776.4 Search Report dated Apr. 23, 2004.
Optics Letter Vo. 16 No. 5 May 1, 1991 pp. 306-308 the Figs.

* cited by examiner

*Primary Examiner*—Frank G Font
*Assistant Examiner*—Mary A El Shammaa
(74) *Attorney, Agent, or Firm*—Williams, Morgan & Amerson

(57) ABSTRACT

The present invention provides a method and apparatus for transforming optical wave modes. The apparatus includes a substrate and a first layer of waveguiding material above the substrate, the first layer having a first index of refraction, a first horizontal dimension, and a first vertical dimension. The apparatus also includes a second layer of waveguiding material adjacent the first layer, the second layer having a second index of refraction, a second horizontal dimension, and a second vertical dimension.

38 Claims, 4 Drawing Sheets

METHOD AND APPARATUS FOR TRANSFORMING OPTICAL WAVE MODES

BACKGROUND OF THE INVENTION

1. Field of the Invention

This invention relates generally to an optical transmission system, and, more particularly, to a method and apparatus for transforming optical wave modes in an optical wave-guide transmission system.

2. Description of the Related Art

Photonics, the use of light to store, transmit, and/or process information, is rapidly penetrating the market for commodity and high technology products. For example, optics is the transmission medium of choice for many metropolitan and local-area networks. Lasers are often used to provide light to photonic devices, which may be optically coupled to the laser by a waveguide. The waveguide transfers the light from the laser to the photonic device and, in some cases, may act as an impedance matching device and/or a filter. For example, many efforts are directed to closely integrating laser sources, detectors, and other microelectronic devices with optical devices formed using wave-guide technology.

FIGS. 1A-C conceptually illustrate a conventional process flow for forming a waveguide 100, which includes a lower buffer layer 105, a waveguiding element 110, and an upper buffer layer 115, as shown in FIG. 1C. In various embodiments, the lower buffer layer 105, the waveguiding element 110, and the upper buffer layer 115 may be formed using materials having optical qualities appropriate to the particular application. Referring now to FIG. 1A, a layer of waveguiding material 120 having a vertical dimension $T_w$ is deposited over the lower buffer layer 110. A photoresist mask 125 having a horizontal dimension $D_p$ and a vertical dimension $T_p$ is then formed over the layer of waveguiding material 120. The horizontal dimension $D_p$ approximately corresponds to the desired horizontal dimension $D_w$ (shown in FIG. 1B) of the waveguiding element 110 formed by the etching process. The vertical dimension $T_p$ of the photoresist mask 125 is determined, at least in part, by the desired anisotropy of the etching process and/or the vertical dimension $T_w$.

An etchant 130 is provided to remove exposed portions of the layer of waveguiding material 120. For example, reactive ion etching techniques may be used to remove exposed portions of the layer of waveguiding material 120. Once the etching is complete, the photoresist mask 125 is removed, leaving the waveguiding element 110, as shown in FIG. 1B. The upper buffer layer 115 may then be formed over the waveguiding element 110 and portions of the lower buffer layer 105. For example, the upper buffer layer 115 may be conformally deposited over the waveguiding element 110 and the lower buffer layer 105.

The waveguide 100 described above may suffer from a number of drawbacks, particularly when used to transfer light modes from a laser to a photonic device. The horizontal dimension $D_w$ of the etched waveguiding element 110 is determined, at least in part, by the horizontal dimension $D_p$, which may in turn be determined, at least in part, by the vertical dimension $T_p$, which, as described above, depends upon $T_w$. Thus, constraints imposed by the desired anisotropy of the etching process and/or the vertical dimension $T_w$ of the layer of waveguiding material 120 may limit the horizontal dimension $D_w$ of the etched waveguiding element 110. For example, conventional etched waveguiding elements 110 have horizontal dimensions $D_w$ of about 4-6 microns.

Moreover, the photoresist mask 125 may erode during the etching process. Since the duration of the etching process is approximately proportional to the vertical dimension $T_w$ of the layer of waveguiding material 120, the amount of the photoresist mask 125 that may erode during the etching process may be approximately proportional to the vertical dimension $T_w$. Thus, increasing the vertical dimension $T_w$ may increase erosion of the photoresist mask 125. Erosion of the photoresist mask 125 may lead to a corresponding reduction in the accuracy with which the etching process may transfer the pattern of the photoresist mask 125 to the layer of waveguiding material 120.

Furthermore, modal confinement factors of the laser, the wave-guide, and the transmission systems fiber may be different. For example, the laser modes may be characterized by strong linear polarization, normally in a plane horizontal to the device, and the laser modes at an output facet of the laser may be highly elliptical and have an anisotropic divergence. The highly elliptical modes at the output facet of the laser are difficult to transform into the typical polarization modes of a standard single mode fiber. Consequently, it may be difficult to couple, with low loss, the laser to the standard single mode fiber. In conventional packaged assemblies, anamorphic lenses are used to optimize launch efficiencies. Alternatively, modal transformation of the laser spot is attempted using optical devices that are monolithically integrated into the laser structure. However, the complexity and consequent cost incurred by including anamorphic lenses, monolithically-integrated optical devices, and the like is highly undesirable from a manufacturing perspective.

SUMMARY OF THE INVENTION

In one aspect of the instant invention, an apparatus is provided for dynamically transforming optical wave modes. The apparatus includes a substrate and a first layer of waveguiding material above the substrate, the first layer having a first index of refraction, a first horizontal dimension, and a first vertical dimension. The apparatus also includes a second layer of waveguiding material adjacent the first layer, the second layer having a second index of refraction, a second horizontal dimension, and a second vertical dimension.

In another aspect of the present invention, a method is provided for forming a device for dynamically transforming optical wave modes. The method includes forming a first layer of waveguiding material above a substrate such that the first layer has a first index of refraction, a first horizontal dimension, and a first vertical dimension and forming a second layer of waveguiding material above the first layer such that the second layer has a second index of refraction, a second horizontal dimension, and a second vertical dimension.

BRIEF DESCRIPTION OF THE DRAWINGS

The invention may be understood by reference to the following description taken in conjunction with the accompanying drawings, in which like reference numerals identify like elements, and in which.

Figure 1A:
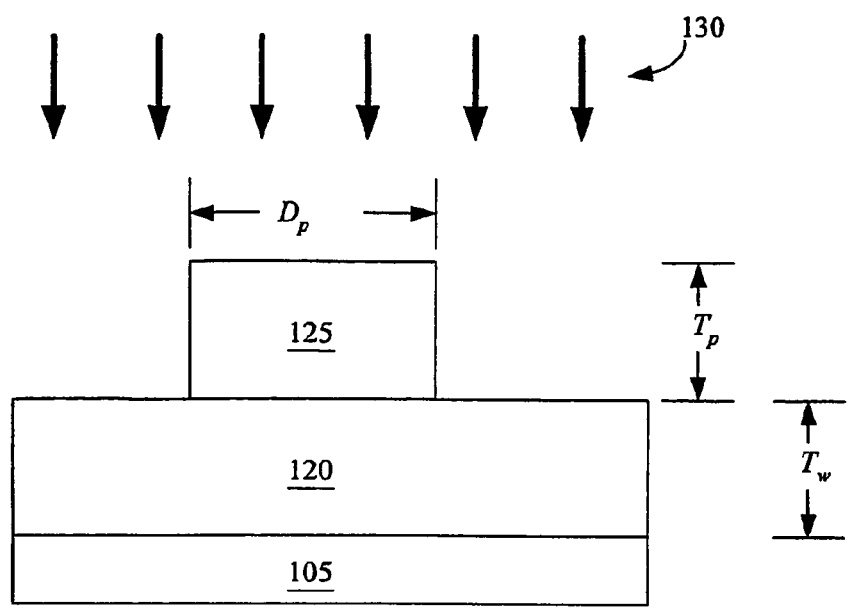
FIGS. 1A, 1B, and 1C conceptually illustrate a conventional process flow for forming a waveguide.
Figure 1B:
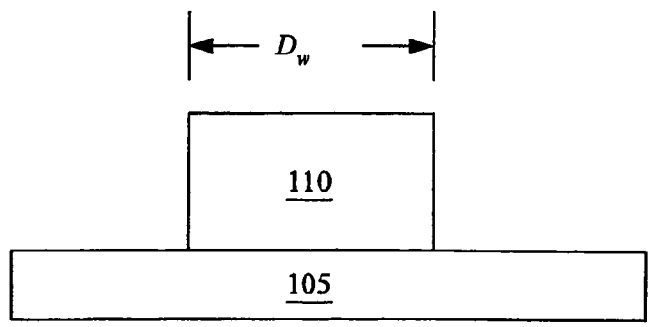
Figure 1C:
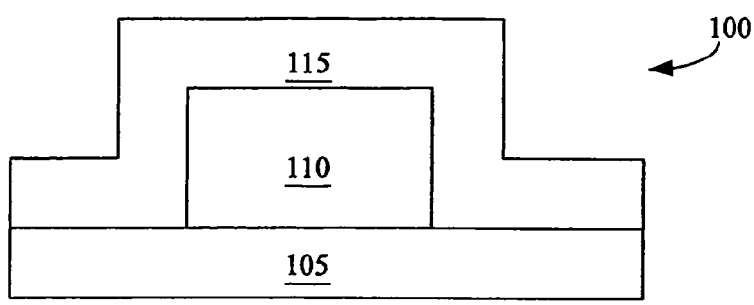

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention will now be described with reference to the attached figures. Although the various regions and structures depicted in the drawings have very precise, sharp configurations and profiles, those skilled in the art recognize that, in reality, these regions and structures are not as precise as indicated in the drawings. Additionally, the relative sizes of the various features depicted in the drawings may be exaggerated or reduced as compared to the size of those features on fabricated devices. Thus, while the drawings may not be drawn to scale, they are included to describe and explain illustrative examples of the present invention.

The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 2A:
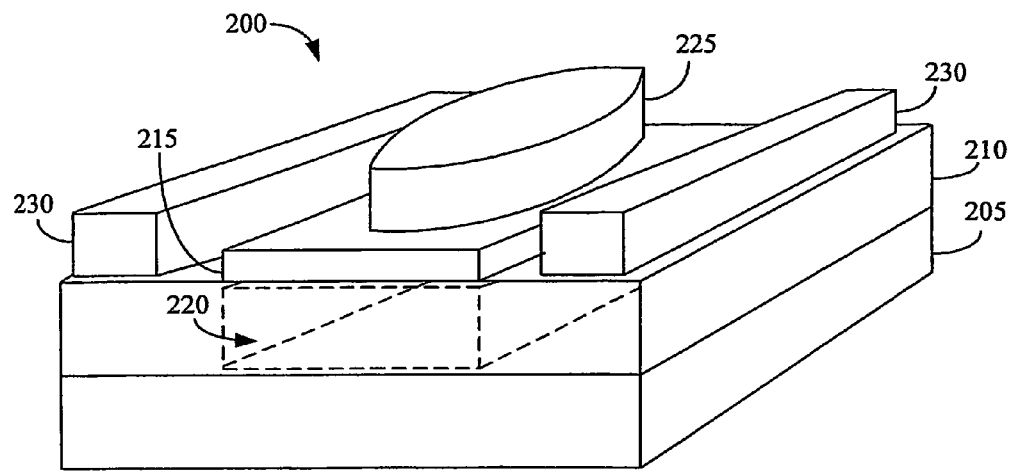
FIG. 2A conceptually illustrates one embodiment of a strip-loaded waveguide device.

FIG. 2A conceptually illustrates one embodiment of a waveguiding device 200, which will be referred to hereinafter as a strip-loaded waveguide 200. The strip-loaded waveguide 200 includes a substrate 205. In various alternative embodiments, the substrate 205 may include materials such as silicon, silica, one or more polymers, and the like. A waveguiding layer 210 is disposed above the substrate 205 and a strip waveguide 215 is disposed above the waveguiding layer 210. Although the embodiment of the strip-loaded waveguide 200 shown in FIG. 2A is preferred, persons of ordinary skill in the art will appreciate that the relative position of elements of the strip-loaded waveguide 200 may be changed in alternative embodiments. For example, the structure described above could be reversed such that the strip waveguide 215 is beneath the waveguiding layer 210.

In accordance with one embodiment of the present invention, the strip waveguide 215 may have a vertical dimension that is less than corresponding vertical dimension of the waveguiding layer 210. For example, the strip waveguide 215 may have a vertical dimension of approximately 350 angstroms and the waveguiding layer 210 have a vertical dimension of about 4-6 microns. Moreover, in alternative embodiments, the strip waveguide 215 may have vertical and/or horizontal dimensions that are less than corresponding vertical and/or horizontal dimensions of the waveguiding layer 210. For example, the strip waveguide 215 may have a horizontal dimension of approximately 4-6 microns and the waveguiding layer 210 may have a horizontal dimension equal to or larger that the horizontal dimension of the strip waveguide 215.

The strip waveguide 215 has index of refraction that is larger than a corresponding index of refraction of the waveguiding layer 210. In one embodiment, the indices of refraction of the strip waveguide 215 and the waveguiding layer 210 are selected so that a selected electromagnetic mode may propagate substantially in a portion 220 of the waveguiding layer 210 beneath the strip waveguide 215. In various alternative embodiments, the selected mode may be any desirable electromagnetic mode, such as a transverse electric mode, i.e. an electromagnetic mode whose electric field vector is substantially parallel to the substrate 205. The index of refraction of the strip waveguide 215 at a wavelength of approximately 1550 nm may be selected to be approximately 2, and the index of refraction of the waveguiding layer 210 at a wavelength of approximately 1550 nm may be selected to be approximately 1.5, so that the selected electromagnetic mode may propagate substantially in the waveguiding layer 210.

The boundaries of the portion 220 of the waveguiding layer 210 in which the selected electromagnetic mode propagates are approximately defined by the horizontal and vertical dimensions of the strip waveguide 215, the vertical dimension of the waveguiding layer 210, and the refractive indices of the layers 210, 215. However, persons of ordinary skill in the art will appreciate that the boundaries of the portion 220 may not be as precise as indicated in FIG. 2A. Moreover, the boundaries of the portion 220 may not exactly correspond to the region directly beneath the strip waveguide 215 and defined by the horizontal dimension of the strip waveguide 215 and the vertical dimension of the waveguiding layer 210. Thus, some of the selected electromagnetic mode may propagate outside of the boundary defined by the horizontal dimension of the strip waveguide 215 and the vertical dimension of the waveguiding layer 210.

Although not necessary for the practice of the present invention, in one embodiment, the strip-loaded waveguide 200 may include an active element 225 disposed above the strip waveguide 215. In various embodiments, the active element 225 may be electro-optically and/or magneto-optically active. The active element 225 may include materials such as a liquid crystal, a polymer dispersed liquid crystal, electro-optic polymers and the like. An index of refraction of the active element 225 may vary in response to an applied electric field. For example, the index of refraction of the liquid crystal may vary from approximately 1.6 to approximately 1.8 when an electric field of about 1V to 10V per micron is applied. Moreover, the active element 225 may be birefringent. In one embodiment, the multiple indices of refraction of the birefringent active element 225 may vary in response to an applied electric field.

In one embodiment, a plurality of electrodes 230 is disposed proximate the active element 225. Although two electrodes 230 are shown aligned approximately parallel to the active element 225 in FIG. 2A, the present invention is not so limited. In various alternative embodiments, any desirable number of electrodes 230 may be deployed in any desirable arrangement proximate the active element 225. For example, alternative arrangements of the electrodes 230 may be used to provide different electric field distributions advantageous to accessing different modes of operation of the electro-active or magneto-optic medium.

The one or more indices of refraction of the active element 225 may be selected so that a portion of the selected electromagnetic mode propagates in the active element 225. In one embodiment, the index of refraction of the active element 225 may be selected to be intermediate the indices of refraction of the strip waveguide 215 and the waveguiding layer 210. For example, the index of refraction of the strip waveguide 215 may be selected to be approximately 2, the index of refraction of the waveguiding layer 210 may be selected to be approximately 1.5, and the index of refraction of the active element 225 may be selected to be approximately 1.6. Alternatively, the index of refraction of the active element 225 may be selected to be larger than the indices of refraction of the strip waveguide 215 and the waveguiding layer 210.

Figure 2B:
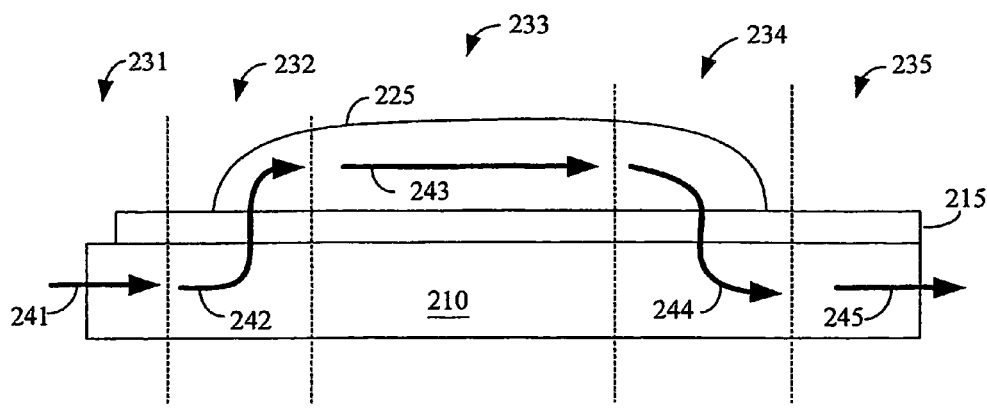
FIG. 2B conceptually illustrates a cross-sectional view of one embodiment of the strip-loaded waveguide shown in FIG. 2A, including an electro-optically active element.

FIG. 2B conceptually illustrates a cross-sectional view of one embodiment of the strip-loaded waveguide 200 including the active element 225. For illustrative purposes, the cross-sectional view of the strip-loaded waveguide 200 shown in FIG. 2B may be divided into five regions 231, 232, 233, 234, 235, which are delineated by dashed vertical lines. However, persons of ordinary skill in the art will appreciate that the regions 231, 232, 233, 234, 235 are merely illustrative and are not intended to limit the present invention. In particular, the regions 231, 232, 233, 234, 235 may not correspond to any specific structural elements of the present invention. Moreover, in the interest of clarity, the selected electromagnetic mode is depicted as propagating along the path indicated by arrows 241, 242, 243, 244, 245 in FIG. 2B. However, persons of ordinary skill in the art will appreciate that portions of the selected electromagnetic mode indicated by arrows 241, 242, 243, 244, 245 may propagate in other parts of the strip-loaded waveguide 200. For example, an evanescent portion of the selected electromagnetic mode indicated by the arrow 243 may propagate in the strip waveguide 215 and/or the waveguiding layer 210.

In the region 231, the selected electromagnetic mode, indicated by arrow 241, propagates in the portion 220 of the waveguiding layer 210. In the region 232, the selected electromagnetic mode may be transferred from the waveguiding layer 210, through the strip waveguide 215, and into the active element 225, as indicated by the arrow 242. In the illustrated embodiment, the end of the active element 225 located approximately in the region 232 is tapered, which may smooth the transfer of the selected electromagnetic mode from the waveguiding layer 210 to the active element 225.

In the region 233, the selected electromagnetic mode propagates in the active element 225, as indicated by arrow 243. As will be discussed in detail later, properties of the selected electromagnetic mode, such as polarization, phase, profile, and the like, may be changed as the selected electromagnetic mode propagates in the active element 225.

In the region 234, the selected electromagnetic mode may be transferred from the active element 225, through the strip waveguide 215, and into the waveguiding layer 210, as indicated by the arrow 244. In the illustrated embodiment, the end of the active element 225 located approximately in the region 234 is tapered, which may smooth the transfer of the selected electromagnetic mode from the active element 225 to the waveguiding layer 210. In the region 235, the selected electromagnetic mode propagates in the portion 220 of the waveguiding layer 210, as indicated by arrow 245. In alternative embodiments, the width of the strip loaded layer 215 may also be shaped to facilitate modal transforms either within or without the active element 225.

Figure 3A:
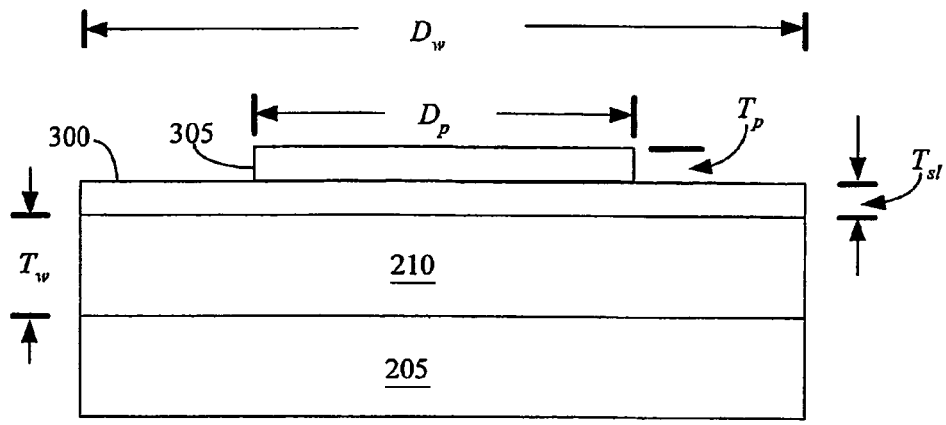
FIGS. 3A, 3B, and 3C conceptually illustrate one embodiment of a process flow that may be used to form the strip-loaded waveguide shown in FIG. 2A.
Figure 3B:
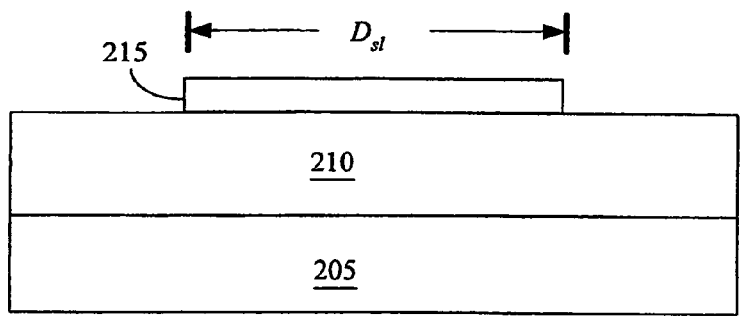
Figure 3C:
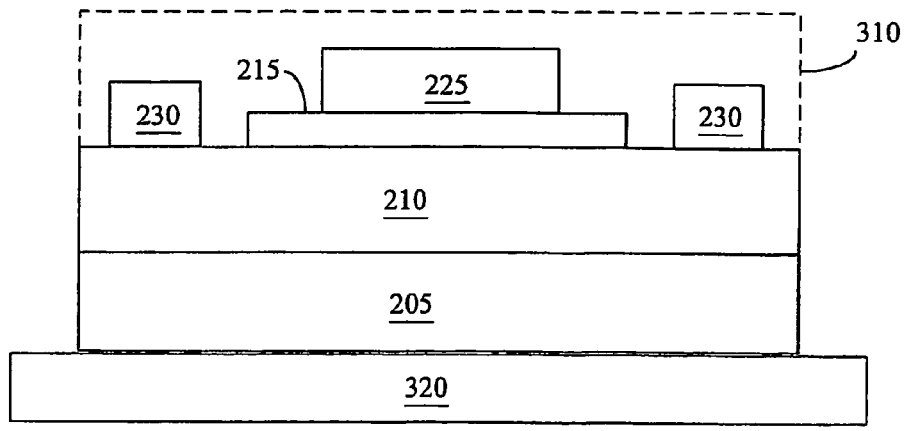

FIGS. 3A, 3B, and 3C conceptually illustrate one embodiment of a process flow that may be used to form the strip-loaded waveguide 200. As shown in FIG. 3A, the waveguiding layer 210 may be formed above the substrate 205 using any of a variety of well-known techniques. In the illustrated embodiment the waveguiding layer 210 has a horizontal dimension $D_w$ and a vertical dimension $T_w$. For example, the vertical dimension $T_w$ of the waveguiding layer 210 may be approximately 4-6 microns. In various alternative embodiments, the waveguiding layer 210 may comprise doped or un-doped silicon dioxide, silicon, one or more polymers, and other like materials.

A strip waveguide layer 300 is formed above the waveguiding layer 210 by any of a variety of known techniques. In various alternative embodiments, the strip waveguide layer 300 may comprise silicon, silicon nitride, diamond or diamond-like carbon, one or more polymers, and/or other like materials. The strip waveguide layer 300 has a vertical dimension $T_{sl}$ that is smaller than the vertical dimension $T_w$ of the waveguiding layer 210. For example, the strip waveguide layer 300 may have a vertical dimension $T_{sl}$ of approximately 350 angstroms and the waveguiding layer 210 may have a vertical dimension of approximately 4-6 microns.

A patterned photoresist mask 305 is formed above the strip waveguide layer 300 using any of a variety of known techniques. The patterned photoresist mask 305 has a vertical dimension $T_p$ and a horizontal dimension $D_p$. Although the present invention is not so limited, the vertical dimension $T_p$ in the illustrated embodiment is proportional to the vertical dimension $T_{sl}$ of the strip waveguide layer 300. For example, a proportionally thin patterned photoresist mask 305 may be employed in embodiments that use a very thin strip-waveguide layer 300. Since the vertical dimension $T_p$ and the vertical dimension $T_{sl}$ are smaller than the vertical dimension $T_w$ of the waveguiding layer 210, the duration of the etching process used to etch the strip waveguide layer 300 may be reduced relative to the duration of the etching process that may be used to etch the waveguiding layer 210. Consequently, erosion of the patterned photoresist mask 305 during the etching process may be reduced.

In the illustrated embodiment, the horizontal dimension $D_p$ is less than the horizontal dimension $D_w$ of the waveguiding layer 210 and larger than the vertical dimension $T_p$ of the patterned photoresist mask 305. However, the present invention is not so limited. In one alternative embodiment, the patterned horizontal dimension $D_p$ and/or a longitudinal length (not shown) may be reduced to minimal dimensions to form periodic or aperiodic patterns limited only by the capability and resolution of the patterned photoresist mask 305. For example, the horizontal dimension $D_p$ may be approximately equal to 350 angstroms or, alternatively, the horizontal dimension $D_p$ may be divided multifold. The resolution of the patterned photoresist mask 305, which is approximately limited by the chosen imprinting technique, such as ultra-violet, e-beam, nano-imprint lithographic techniques, and the like, may be reduced relative to the resolution of a photoresist mask (not shown) used when etching the waveguiding layer 210 because the vertical dimension $T_p$ is smaller than the vertical dimension $T_w$ of the waveguiding layer 210, because only a very thin layer needs to be etched.

The strip waveguide layer 300 may be etched using the patterned photoresist mask 305 to form a strip waveguide 215, as shown in FIG. 3B. In one embodiment, a reactive ion etching techniques may be used to etch the strip waveguide layer 300. However, in alternative embodiments, any desirable etching technique may be used to etch the strip waveguide layer 300. A horizontal dimension $D_{sl}$ of the strip waveguide 215 is approximately equal to the horizontal dimension $D_m$ of the patterned photoresist mask 305. Alternatively, the strip waveguide 215 may be directly printed via a multitude of techniques, such as soft lithographic or contact printing techniques that can provide limiting precision appropriate to the needs of the device designs.

Although not necessary for the practice of the present invention, the active element 225 may be formed above the strip waveguide 215, as shown in FIG. 3C. In one embodiment, the active element 225 may be formed by applying a wetting material (not shown) to a portion of the strip waveguide 215 to define a wettable pad (not shown). For example, polymethyl disiloxane may be applied to the portion of the strip waveguide 215. The active element 225 is then formed above the defined wettable pad (not shown). In alternative embodiments, other soft lithography processes may be used to form the active element 225.

The dimensions of the active element 225 formed by the aforementioned soft lithography processes may be determined using visco-elastic properties or a dielectric loss tangent of the materials used to form the active element 225, as well as the properties of the wetting materials. Consequently, the active element 225 may be used to perform an adaptive mode transformation of the selected electromagnetic mode. In one embodiment, the profile of the selected electromagnetic mode may be varied using the properties of the active element 225. For example, the profile of the selected electromagnetic mode may be changed from an ellipse to a circle. In other embodiments, the spatial extent and plane of propagation the selected electromagnetic mode may be adjusted using the properties of the active element 225.

As discussed above, one or more electrodes 230 may also be formed proximate to the electro-optically active waveguiding element 225. Moreover, in one alternative embodiment, an upper cladding layer 310 (indicated by dashed lines) may be formed above the electrodes 230, the active element 225 the strip waveguide 215, and portions of the waveguiding layer 210. The upper cladding layer 310 may be formed of materials including silicones, silicon containing polymers, one or more organic polymers, and the like. Alternatively, silicate glasses and the like may be used to form the upper cladding layer 310. For example, silicate glasses and other similar may be used to form the upper cladding layer 310 in embodiments wherein there is an adherence to the device function substantially realized in materials other than polymers.

In one embodiment, the process flow described above with reference to FIGS. 3A, 3B, and 3C, may be a low temperature process. For example, the aforementioned process may be carried out at temperatures that are below about 473° K. In contrast, process flows for forming conventional waveguides may be carried out at temperatures that are in excess of about 1000° K. Consequently, the process flow described above with reference to FIGS. 3A, 3B, and 3C may be advantageously used to integrate the functionality of the strip-loaded waveguide 200 directly upon an active deep CMOS chip 320.

Figure 4:
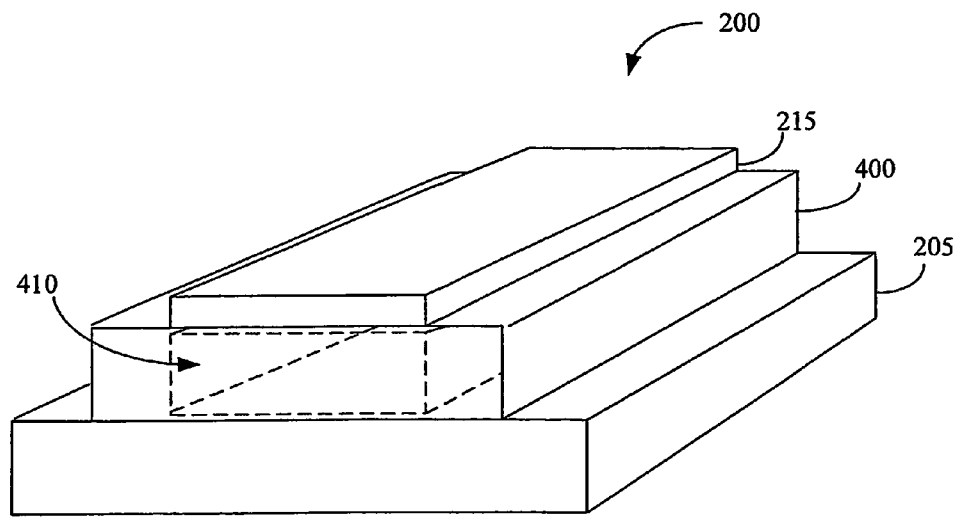
FIG. 4 conceptually illustrates one alternative embodiment of the strip-loaded waveguide shown in FIG. 2A.

FIG. 4 conceptually illustrates one alternative embodiment of the strip-loaded waveguide 200. In the alternative embodiment of the strip loaded waveguide 200 shown in FIG. 4, the waveguiding layer 210 has been patterned to form a waveguiding element 400 having a vertical dimension that is smaller than vertical dimension of the substrate 205. As discussed above, a selected electromagnetic mode propagates substantially in the region 410 of the waveguiding element 400. The boundaries of the region 410 are approximately determined by a horizontal dimension of the strip waveguide 215 above the waveguide element 400 and the vertical dimension of the waveguide element 400. Although not shown in FIG. 4, the alternative embodiment of the strip-loaded wave guide 200 may include one or more electrodes, such as the electrodes 230 shown in FIG. 2A, and an electro-optically active element above the strip waveguide 215, such as the active element 225 shown in FIG. 2A.

Figure 5:
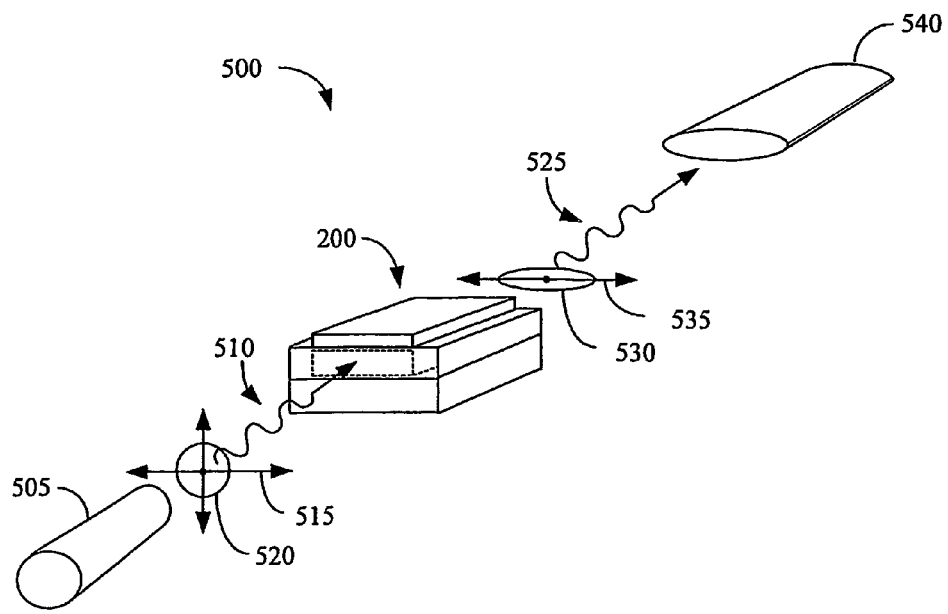
FIG. 5 conceptually illustrates a system for transforming optical wave modes that uses the strip-loaded waveguide shown in FIG. 2A.

FIG. 5 conceptually illustrates a system 500 for optical mode transformation that uses the strip-loaded waveguide 200. A light source 505 provides light 510 to the strip-loaded waveguide 200. In one embodiment, the light source 505 is a laser. The light 510 may be a selected electromagnetic mode, such as an electromagnetic mode that is polarized along one or more of the axes 515. For example, the selected electromagnetic mode may be a transverse electric mode. The light 510 may also have a selected profile that may be determined, at least in part, by the light source 505. For example, the light 510 may have an approximately circular profile 520. However, in alternative embodiments, the light 510 may have any desirable profile including, but not limited to, elliptical.

In the illustrated embodiment, the strip-loaded waveguide 200 performs an optical mode transformation of the selected electromagnetic mode of the light 510. The transmitted light 525 has a transformed electromagnetic mode that has an approximately elliptical optical profile 530 and is polarized approximately along the axis 535. However, the particular optical mode transformation is not material to the present invention and persons of ordinary skill in the art will appreciate that the strip loaded waveguide 200 may perform the optical mode transformation of the selected electromagnetic mode into any desirable transformed electromagnetic-mode. In various alternative embodiments, the optical mode transformation may change the profile of the selected electromagnetic mode, the polarization of the selected electromagnetic mode, any combination of the profile and the polarization, or any other desirable property of the selected electromagnetic mode.

The light 525 having the transformed electromagnetic mode may be provided to an optical device 540. In one embodiment, the optical device 540 is a portion of an optical fiber. However, in alternative embodiments, the optical device 540 may be any desirable optical element including, but not limited to, a waveguide, a ring resonator, a whispering gallery mode object, a grating defined cavity, a photonic crystal, and a photonic band-gap object.

The strip-loaded waveguide 200 may have one or more of several additional advantages over conventional waveguides. These advantages may include performance/cost attributes such as low optical loss due to reduced optical path length, low dielectric constant for high frequency applications, low voltage (approximately 1V) drive combining with the low optical loss to produce a low "$V_{pi}$×loss" figure of merit, broadband functionality, use of low cost manufacturing techniques, improved reliability (via utilisation of low complexity organic chromophores), and array capability for high density, complex device layouts. The aforementioned advantages may, in one embodiment, be realized within one design primitive.

As discussed above, the strip-loaded waveguide 200 may be formed using a low temperature process, which may allow the strip-loaded waveguide 200 to be used beyond the traditional telecommunications application space. In particular, the strip-loaded waveguide 200 described above may prove very attractive to the device community that is currently using silicon and silicon-germanium devices at 10 Gb/s. On these platforms it may prove possible to integrate the functionality of the strip-loaded waveguide 200 directly upon the active deep CMOS chip as a substrate for the device. Thus, silicon based CMOS devices may be used with the strip-loaded waveguide 200 to enable low cost and highly functional chipsets very apt for the 10 Gb/s Ethernet standard and advantageous for deployment in metropolitan and local-area access networks.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A strip loaded waveguide apparatus, comprising:
   a substrate;
   a first layer of waveguiding material above the substrate, the first layer having a first index of refraction, a first horizontal dimension, and a first vertical dimension; and
   a second layer of waveguiding material adjacent the first layer, the second layer having a second index of refraction, a second horizontal dimension, and a second vertical dimension, wherein the first index of refraction, the first horizontal dimension, the first vertical dimension, the second index of refraction, the second horizontal dimension, the second vertical dimension and the arrangement of the first and second layer are arranged to perform an optical mode transformation of light input into the apparatus, wherein the second vertical dimension is smaller than the first vertical dimension, the second horizontal dimension is smaller than the first horizontal dimension, and the second index of refraction is larger than the first index of refraction.

2. The apparatus of claim 1, wherein the optical mode transformation transforms an initial electromagnetic mode into a selected electromagnetic mode that propagates in a portion of the first layer approximately defined by at least one of the second horizontal dimension, the first vertical dimension, the first index of refraction, and the second index of refraction.

3. The apparatus of claim 2, wherein the selected electromagnetic mode is a selected polarization mode.

4. The apparatus of claim 3, wherein the selected polarization mode is a transverse electric mode.

5. The apparatus of claim 1, wherein the second vertical dimension is approximately 350 angstroms.

6. The apparatus of claim 1, wherein the first index of refraction is approximately 1.5 and the second index of refraction is approximately 2.

7. The apparatus of claim 1, wherein the substrate is a CMOS chip substrate.

8. The apparatus of claim 1, further comprising an upper cladding layer above the second layer and at least a portion of the first layer.

9. The apparatus of claim 1, further comprising an active element above a portion of the second layer, the active element having a third index of refraction such that a portion of the selected electromagnetic mode propagates in the active element.

10. The apparatus of claim 9, wherein the active element comprises at least one of an electro-optically active element and a magneto-optically active element.

11. The apparatus of claim 9, further comprising a plurality of electrodes deployed proximate the active element and capable of providing an electric field to the active element.

12. An apparatus, comprising:
    a substrate;
    a first layer of waveguiding material above the substrate, the first layer having a first index of refraction;
    a second layer of waveguiding material above the first layer, the second layer having a second index of refraction; and
    an active element above a portion of the second layer, the active element having a third index of refraction selected such that a portion of the selected electromagnetic mode propagates in the active element, wherein the first index of refraction, the second index of refraction, the third index of refraction and the arrangement of the first and second layers and the active element are selected such that the apparatus performs an optical mode transformation of light input into the apparatus, wherein the first layer of waveguiding material has a first horizontal dimension and a first vertical dimension, wherein the second layer of waveguiding material has a second horizontal dimension and a second vertical dimension, and wherein the second vertical dimension is smaller than the first vertical dimension and the second horizontal dimension is smaller than the first horizontal dimension.

13. The apparatus of claim 12, wherein the selected electromagnetic mode is a selected polarization mode.

14. The apparatus of claim 13, wherein the selected polarization mode is a transverse electric mode.

15. The apparatus of claim 12, wherein the second index of refraction is larger than the first index of refraction such that a selected electromagnetic mode propagates in a portion of the first layer approximately defined by the second horizontal dimension and the first vertical dimension.

16. The apparatus of claim 12, wherein the third index of refraction is intermediate the first and second indices of refraction.

17. The apparatus of claim 12, wherein the third index of refraction is larger than the first and second indices of refraction.

18. The apparatus of claim 12, wherein the active element comprises at least one of an electro-optically active element and a magneto-optically active element.

19. The apparatus of claim 12, wherein the third index of refraction is variable within a range of indices of refraction in response to an electric field applied to the active element.

20. The apparatus of claim 12, further comprising a plurality of electrodes deployed proximate the active element and capable of providing an electric field to the active element.

21. The apparatus of claim 12, wherein the active element has two ends, each end being tapered.

22. The apparatus of claim 12, further comprising an integrated circuit communicatively coupled to the first layer of waveguiding material.

23. The apparatus of claim 22, wherein the integrated circuit is communicatively coupled to at least one of the plurality of electrodes.

24. A method, comprising:
forming a first layer of waveguiding material above a substrate such that the first layer has a first index of refraction, a first horizontal dimension, and a first vertical dimension; and
forming a second layer of waveguiding material above the first layer such that the second layer has a second index of refraction, a second horizontal dimension, and a second vertical dimension, wherein forming the first and second layers comprises selecting the first index of refraction, the first horizontal dimension, the first vertical dimension, the second index of refraction, the second horizontal dimension, the second vertical dimension and the arrangement of the first and second layer so that the first and second layers of waveguiding material perform an optical mode transformation of input light, wherein forming the second layer comprises forming the second layer such that second vertical dimension is smaller than the first vertical dimension, the second horizontal dimension is smaller than the first horizontal dimension, and the second index of refraction is larger than the first index of refraction.

25. The method of claim 24, wherein forming the second layer comprises forming the second layer such that a selected electromagnetic mode propagates in a portion of the first layer approximately defined by the second horizontal dimension and the first vertical dimension.

26. The method of claim 24, further comprising forming an upper cladding layer above the second layer and at least a portion of the first layer.

27. The method of claim 24, further comprising forming an active element above a portion of the second layer, the active element having a third index of refraction such that a portion of the selected electromagnetic mode propagates in the active element.

28. The method of claim 27, wherein forming the active element comprises forming at least one of an electro-optically active element and a magneto-optically active element.

29. The method of claim 27, further comprising forming a plurality of electrodes proximate the active element and capable of providing an electric field to the active element.

30. A method, comprising:
forming a first layer of waveguiding material above a substrate, the first layer having a first index of refraction, a first horizontal dimension, and a first vertical dimension;
forming a second layer of waveguiding material above the first layer, the second layer having a second index of refraction, a second horizontal dimension, and a second vertical dimension, the second vertical dimension being smaller than the first vertical dimension, the second horizontal dimension being smaller than the first horizontal dimension, and the second index of refraction being larger than the first index of refraction such that a selected electromagnetic mode propagates in a portion of the first layer approximately defined by the second horizontal dimension and the first vertical dimension;
forming an active element above a portion of the second layer, the active element having a third index of refraction such that a portion of the selected electromagnetic mode propagates in the active element; and
inputting light in an initial electromagnetic mode into a strip loaded waveguide formed by the first layer, the second layer and the active element and transforming the input light into the selected electromagnetic mode, wherein forming the active element comprises forming the active elements having the third index of refraction that is larger than the first and second indices of refraction.

31. The method of claim 30, wherein forming the active element comprises forming the active elements having the third index of refraction that is intermediate the first and second indices of refraction.

32. The method of claim 30, wherein forming the active element comprises forming at least one of an electro-optically active element and a magneto-optically active element.

33. The method of claim 30, wherein forming the active element comprises forming the active elements having the third index of refraction that is variable within a range of indices of refraction in response to an electric field applied to the active element.

34. The method of claim 30, further comprising forming a plurality of electrodes proximate the active element and capable of providing an electric field to the active element.

35. A system for transforming optical wave modes, comprising:
an optical wave mode transformer optically coupled to a light source that is configured to emit light in an initial electromagnetic mode, the optical wave mode transformer comprising:
a first layer of waveguiding material above a substrate, the first layer having a first index of refraction, a first horizontal dimension, and a first vertical dimension; and
a second layer of waveguiding material above the first layer, the second layer having a second index of refraction, a second horizontal dimension, and a second vertical dimension; and
an optical element that is optically coupled to the optical wave mode transformer to receive a selected electromagnetic mode, wherein the first index of refraction, the first horizontal dimension, the first vertical dimension, the second index of refraction, the second horizontal dimension, the second vertical dimension and the arrangement of the first and second layer are arranged to perform an optical mode transformation of the light input into the strip optical mode wave transformer from the light source so that the selected electromagnetic mode differs from the initial electromagnetic mode, wherein the second vertical dimension is smaller than the first vertical dimension, the second horizontal dimension is smaller than the first horizontal dimension, and the second index of refraction is larger than the first index of refraction.

36. The system of claim 35, wherein at least one of the first index of refraction, the first horizontal dimension, the first vertical dimension, the second index of refraction, the second horizontal dimension, and the second vertical dimension are selected such that a selected electromagnetic mode provided by the light source propagates in a portion of the first layer approximately defined by the second horizontal dimension and the first vertical dimension.

37. The system of claim 35, wherein the optical wave mode transformer further comprises:
an active element above a portion of the second layer, the active element having a third index of refraction such that a portion of the selected electromagnetic mode propagates in the active element; and
a plurality of electrodes deployed proximate the electro-optically active element and capable of providing an electric field to the electro-optically active element.

38. The system of claim 35, wherein the active element comprises at least one of an electro-optically active element and a magneto-optically active element.

* * * * *